(12) United States Patent
Basir et al.

(10) Patent No.: US 8,838,075 B2
(45) Date of Patent: Sep. 16, 2014

(54) COMMUNICATION SYSTEM WITH VOICE MAIL ACCESS AND CALL BY SPELLING FUNCTIONALITY

(75) Inventors: Otman A. Basir, Waterloo (CA); William Ben Miners, Guelph (CA)

(73) Assignee: Intelligent Mechatronic Systems Inc., Waterloo, Ontario ( * ) Notice: Subject to any disclaimer, the term of this patent is extended or adjusted under 35 U.S.C. 154(b) by 1226 days.

(21) Appl. No.: 12/488,013

(22) Filed: Jun. 19, 2009

(65) Prior Publication Data

US 2009/0318119 A1 Dec. 24, 2009

Related U.S. Application Data

(60) Provisional application No. 61/074,137, filed on Jun. 19, 2008.

(51) Int. Cl.
*H04M 11/10* (2006.01)
*H04M 3/533* (2006.01)
*H04M 1/27* (2006.01)

(52) U.S. Cl.
CPC .......... *H04M 3/533* (2013.01); *H04M 3/53333* (2013.01); *H04M 2203/4509* (2013.01); *H04M 1/271* (2013.01)
USPC .............................. 455/413; 704/235; 705/39

(58) Field of Classification Search
CPC ........ H04W 4/14; G10L 15/265; G06Q 10/06
USPC .......... 455/466, 413, 414.1; 704/235; 705/39, 705/13, 44
See application file for complete search history.

(56) References Cited

U.S. PATENT DOCUMENTS

| | | | |
|---|---|---|---|
| 3,928,724 A | 12/1975 | Byram et al. | |
| 4,083,003 A | 4/1978 | Haemmig | |

(Continued)

FOREIGN PATENT DOCUMENTS

| | | | |
|---|---|---|---|
| CA | 2405813 A1 | 11/2001 | |
| DE | 19920227 A1 | 11/2000 | |

(Continued)

OTHER PUBLICATIONS

International Search Report for PCT Application No. PCT/CA2006/000946, Nov. 8, 2006.

(Continued)

*Primary Examiner* — Phuoc H Doan
(74) *Attorney, Agent, or Firm* — Carlson, Gaskey & Olds P.C.

(57) ABSTRACT

A method of initiating a communication from a mobile communication device includes receiving a plurality of spoken letters corresponding to a spelling of at least a portion of a contact name and identifying a contact and associated contact information from a database associated with a mobile communication device in response to the spoken letters. A communication to the contact is initiated from the mobile communication device using the associated contact information. A method of presenting voicemail to a user establishes communication with a mobile communication device. A first voicemail box is checked for messages, the first voicemail box being associated with the mobile communication device. A second voicemail box is checked for messages, the second voicemail box being associated with a second communication device. At least one voicemail message received from at least one of the first and second voicemail boxes is presented to a user via a single interface.

28 Claims, 3 Drawing Sheets

(56) References Cited

U.S. PATENT DOCUMENTS

| | | |
|---|---|---|
| 4,532,052 A | 7/1985 | Weaver et al. |
| 4,591,823 A | 5/1986 | Horvat |
| 4,989,144 A | 1/1991 | Barnett, III |
| 5,177,685 A | 1/1993 | Davis et al. |
| 5,246,073 A | 9/1993 | Sandiford et al. |
| 5,488,360 A | 1/1996 | Ray |
| 5,638,425 A | 6/1997 | Meador, III et al. |
| 5,760,742 A | 6/1998 | Branch et al. |
| 5,836,392 A | 11/1998 | Urlwin-Smith |
| 5,912,951 A | 6/1999 | Checchio et al. |
| 5,931,907 A | 8/1999 | Davies et al. |
| 5,938,706 A | 8/1999 | Feldman et al. |
| 5,944,783 A | 8/1999 | Nieten |
| 5,963,618 A | 10/1999 | Porter |
| 5,983,108 A | 11/1999 | Kennedy et al. |
| 6,012,030 A | 1/2000 | French et al. |
| 6,041,300 A | 3/2000 | Ittycheriah et al. |
| 6,088,650 A | 7/2000 | Schipper et al. |
| 6,147,598 A | 11/2000 | Murphy et al. |
| 6,176,315 B1 | 1/2001 | Reddy et al. |
| 6,192,364 B1 | 2/2001 | Baclawski |
| 6,192,986 B1 | 2/2001 | Urlwin-Smith |
| 6,196,317 B1 | 3/2001 | Hardy |
| 6,212,474 B1 | 4/2001 | Fowler et al. |
| 6,253,122 B1 | 6/2001 | Razavi et al. |
| 6,282,495 B1 | 8/2001 | Kirkhart et al. |
| 6,295,449 B1 | 9/2001 | Westerlage et al. |
| 6,356,869 B1 | 3/2002 | Chapados et al. |
| 6,362,748 B1 | 3/2002 | Huang |
| 6,367,022 B1 | 4/2002 | Gillespie et al. |
| 6,377,825 B1 | 4/2002 | Kennedy et al. |
| 6,385,202 B1 | 5/2002 | Katseff et al. |
| 6,529,863 B1 | 3/2003 | Ball et al. |
| 6,553,102 B1 | 4/2003 | Fogg et al. |
| 6,580,973 B2 | 6/2003 | Leivian et al. |
| 6,594,557 B1 | 7/2003 | Stefan et al. |
| 6,607,035 B1 | 8/2003 | Reddy et al. |
| 6,615,130 B2 | 9/2003 | Myr |
| 6,622,083 B1 | 9/2003 | Knockeart et al. |
| 6,650,997 B2 | 11/2003 | Funk |
| 6,690,268 B2 | 2/2004 | Schofield et al. |
| 6,697,638 B1 | 2/2004 | Larsson et al. |
| 6,714,223 B2 | 3/2004 | Asami et al. |
| 6,721,633 B2 | 4/2004 | Funk et al. |
| 6,724,863 B1 | 4/2004 | Bedingfield |
| 6,731,239 B2 | 5/2004 | Wall et al. |
| 6,738,742 B2 | 5/2004 | Smith et al. |
| 6,748,211 B1 | 6/2004 | Isaac et al. |
| 6,764,981 B1 | 7/2004 | Eoff et al. |
| 6,788,935 B2 | 9/2004 | McKenna et al. |
| 6,788,949 B1 | 9/2004 | Bansal |
| 6,812,888 B2 | 11/2004 | Drury et al. |
| 6,812,942 B2 | 11/2004 | Ribak |
| 6,839,669 B1 | 1/2005 | Gould et al. |
| 6,842,510 B2 | 1/2005 | Sakamoto |
| 6,895,084 B1 | 5/2005 | Saylor et al. |
| 6,895,310 B1 | 5/2005 | Kolls |
| 6,909,947 B2 | 6/2005 | Douros et al. |
| 6,925,154 B2 | 8/2005 | Gao et al. |
| 6,944,679 B2 | 9/2005 | Parupudi et al. |
| 6,968,272 B2 | 11/2005 | Knockeart et al. |
| 6,970,703 B2 | 11/2005 | Fuchs et al. |
| 6,970,783 B2 | 11/2005 | Knockeart et al. |
| 6,972,669 B2 | 12/2005 | Saito et al. |
| 6,982,635 B2 | 1/2006 | Obradovich |
| 7,039,166 B1 | 5/2006 | Peterson et al. |
| 7,049,982 B2 | 5/2006 | Sleboda et al. |
| 7,050,834 B2 | 5/2006 | Harwood et al. |
| 7,062,286 B2 | 6/2006 | Grivas et al. |
| 7,069,118 B2 | 6/2006 | Coletrane et al. |
| 7,085,629 B1 | 8/2006 | Gotou et al. |
| 7,091,160 B2 | 8/2006 | Dao et al. |
| 7,113,911 B2 | 9/2006 | Hinde et al. |
| 7,117,075 B1 | 10/2006 | Larschan et al. |
| 7,127,271 B1 | 10/2006 | Fujisaki |
| 7,151,997 B2 | 12/2006 | Uhlmann et al. |
| 7,191,040 B2 | 3/2007 | Pajakowski et al. |
| 7,191,059 B2 | 3/2007 | Asahara |
| 7,228,224 B1 | 6/2007 | Rosen et al. |
| 7,280,975 B1 | 10/2007 | Donner |
| 7,286,825 B2 | 10/2007 | Shishido et al. |
| 7,286,857 B1 | 10/2007 | Walker et al. |
| 7,289,796 B2 | 10/2007 | Kudoh |
| 7,296,066 B2 | 11/2007 | Lehaff et al. |
| 7,346,374 B2 | 3/2008 | Witkowski et al. |
| 7,356,474 B2 | 4/2008 | Kumhyr |
| 7,363,229 B2 | 4/2008 | Falcon et al. |
| 7,366,795 B2 | 4/2008 | O'Neil et al. |
| 7,386,376 B2 | 6/2008 | Basir et al. |
| 7,400,879 B2 | 7/2008 | Lehaff et al. |
| 7,412,078 B2 | 8/2008 | Kim |
| 7,412,328 B2 | 8/2008 | Uhlmann et al. |
| 7,426,647 B2 | 9/2008 | Fleck et al. |
| 7,444,286 B2 | 10/2008 | Roth et al. |
| 7,461,344 B2 | 12/2008 | Young et al. |
| 7,496,514 B2 | 2/2009 | Ross et al. |
| 7,505,951 B2 | 3/2009 | Thompson et al. |
| 7,526,431 B2 | 4/2009 | Roth et al. |
| 7,554,435 B2 | 6/2009 | Tengler et al. |
| 7,646,296 B2 | 1/2010 | Ohki |
| 7,653,545 B1 | 1/2010 | Starkie |
| 7,689,253 B2 | 3/2010 | Basir |
| 7,693,720 B2 | 4/2010 | Kennewick et al. |
| 7,769,364 B2 | 8/2010 | Logan et al. |
| 7,801,283 B2 | 9/2010 | Harwood et al. |
| 7,814,353 B2 | 10/2010 | Naitou et al. |
| 7,859,392 B2 | 12/2010 | McClellan et al. |
| 7,865,309 B2 | 1/2011 | Taylor |
| 7,881,864 B2 | 2/2011 | Smith |
| 7,912,186 B2 | 3/2011 | Howell et al. |
| 7,948,969 B2 | 5/2011 | Boys |
| 7,983,811 B2 | 7/2011 | Basir et al. |
| 8,015,010 B2 | 9/2011 | Basir |
| 8,060,285 B2 | 11/2011 | Chigusa |
| 8,090,848 B2 | 1/2012 | Maes et al. |
| 8,195,467 B2 | 6/2012 | Mozer et al. |
| 8,218,737 B2 | 7/2012 | Odinak |
| 8,289,186 B2 | 10/2012 | Osafune |
| 8,350,721 B2 | 1/2013 | Carr |
| 2001/0005854 A1 | 6/2001 | Murata et al. |
| 2001/0021640 A1 | 9/2001 | Lappe |
| 2001/0056345 A1 | 12/2001 | Guedalia |
| 2002/0032042 A1 | 3/2002 | Poplawsky et al. |
| 2002/0041659 A1 | 4/2002 | Beswick et al. |
| 2003/0181543 A1 | 9/2003 | Reddy et al. |
| 2003/0227390 A1 | 12/2003 | Hung et al. |
| 2003/0231550 A1 | 12/2003 | Macfarlane |
| 2004/0001575 A1 | 1/2004 | Tang |
| 2004/0058647 A1 | 3/2004 | Zhang et al. |
| 2004/0082340 A1 | 4/2004 | Eisinger |
| 2004/0090950 A1 | 5/2004 | Lauber et al. |
| 2004/0102188 A1 | 5/2004 | Boyer et al. |
| 2004/0104842 A1 | 6/2004 | Drury et al. |
| 2004/0116106 A1 | 6/2004 | Shishido et al. |
| 2004/0133345 A1 | 7/2004 | Asahara |
| 2004/0145457 A1 | 7/2004 | Schofield et al. |
| 2004/0158367 A1 | 8/2004 | Basu et al. |
| 2004/0182576 A1 | 9/2004 | Reddy et al. |
| 2004/0193420 A1 | 9/2004 | Kennewick et al. |
| 2004/0240633 A1* | 12/2004 | Sloan ................. 379/88.16 |
| 2004/0243406 A1 | 12/2004 | Rinscheid |
| 2004/0257210 A1 | 12/2004 | Chen et al. |
| 2005/0046584 A1 | 3/2005 | Breed |
| 2005/0049781 A1 | 3/2005 | Oesterling |
| 2005/0054386 A1 | 3/2005 | Chung |
| 2005/0066207 A1 | 3/2005 | Fleck et al. |
| 2005/0088320 A1 | 4/2005 | Kovach |
| 2005/0107132 A1 | 5/2005 | Kamdar et al. |
| 2005/0107944 A1 | 5/2005 | Hovestadt et al. |
| 2005/0130631 A1 | 6/2005 | Maguire et al. |
| 2005/0131677 A1 | 6/2005 | Assadollahi |
| 2005/0135573 A1 | 6/2005 | Harwood et al. |
| 2005/0143134 A1 | 6/2005 | Harwood et al. |
| 2005/0174217 A1 | 8/2005 | Basir et al. |

(56) References Cited

U.S. PATENT DOCUMENTS

| | | |
|---|---|---|
| 2005/0203741 A1* | 9/2005 | Thwing .................. 704/254 |
| 2005/0230434 A1 | 10/2005 | Campbell et al. |
| 2005/0285743 A1 | 12/2005 | Weber |
| 2005/0288190 A1 | 12/2005 | Dao et al. |
| 2006/0009885 A1 | 1/2006 | Raines et al. |
| 2006/0030298 A1 | 2/2006 | Burton et al. |
| 2006/0052921 A1 | 3/2006 | Bodin et al. |
| 2006/0055565 A1 | 3/2006 | Kawamata et al. |
| 2006/0089754 A1 | 4/2006 | Mortenson |
| 2006/0101311 A1 | 5/2006 | Lipscomb et al. |
| 2006/0214783 A1 | 9/2006 | Ratnakar |
| 2006/0217858 A1 | 9/2006 | Peng |
| 2006/0271275 A1 | 11/2006 | Verma |
| 2007/0016813 A1 | 1/2007 | Naitou et al. |
| 2007/0038360 A1 | 2/2007 | Sakhpara |
| 2007/0042812 A1 | 2/2007 | Basir |
| 2007/0043574 A1 | 2/2007 | Coffman et al. |
| 2007/0050108 A1 | 3/2007 | Larschan et al. |
| 2007/0118380 A1 | 5/2007 | Konig |
| 2007/0162552 A1 | 7/2007 | Shaffer et al. |
| 2008/0004875 A1 | 1/2008 | Chengalvarayan et al. |
| 2008/0027643 A1 | 1/2008 | Basir et al. |
| 2008/0031433 A1 | 2/2008 | Sapp et al. |
| 2008/0071465 A1 | 3/2008 | Chapman et al. |
| 2008/0119134 A1 | 5/2008 | Rao |
| 2008/0132270 A1 | 6/2008 | Basir |
| 2008/0133230 A1 | 6/2008 | Herforth |
| 2008/0140408 A1 | 6/2008 | Basir |
| 2008/0201135 A1 | 8/2008 | Yano |
| 2008/0252487 A1 | 10/2008 | McClellan et al. |
| 2008/0263451 A1 | 10/2008 | Portele et al. |
| 2008/0270015 A1 | 10/2008 | Ishikawa et al. |
| 2008/0306740 A1 | 12/2008 | Schuck et al. |
| 2009/0011799 A1 | 1/2009 | Douthitt et al. |
| 2009/0099836 A1 | 4/2009 | Jacobsen et al. |
| 2009/0106036 A1 | 4/2009 | Tamura et al. |
| 2009/0124272 A1* | 5/2009 | White et al. .................. 455/466 |
| 2009/0161841 A1 | 6/2009 | Odinak |
| 2009/0176522 A1 | 7/2009 | Kowalewski et al. |
| 2009/0204410 A1 | 8/2009 | Mozer et al. |
| 2009/0259349 A1 | 10/2009 | Golenski |
| 2009/0298474 A1 | 12/2009 | George |
| 2009/0318119 A1 | 12/2009 | Basir et al. |
| 2010/0023246 A1 | 1/2010 | Zhao et al. |
| 2010/0036595 A1 | 2/2010 | Coy et al. |
| 2010/0097239 A1 | 4/2010 | Campbell et al. |
| 2010/0100307 A1 | 4/2010 | Kim |
| 2010/0130180 A1 | 5/2010 | Lim |
| 2010/0137037 A1 | 6/2010 | Basir |
| 2010/0138140 A1 | 6/2010 | Okuyama |
| 2010/0159968 A1 | 6/2010 | Ng |
| 2010/0198428 A1 | 8/2010 | Sultan et al. |
| 2010/0211301 A1 | 8/2010 | McClellan |
| 2010/0222939 A1 | 9/2010 | Namburu et al. |
| 2010/0280884 A1 | 11/2010 | Levine et al. |
| 2011/0302253 A1 | 12/2011 | Simpson-Anderson et al. |

FOREIGN PATENT DOCUMENTS

| | | |
|---|---|---|
| DE | 102007062958 A1 | 6/2009 |
| EP | 1 575 225 A2 | 9/2005 |
| EP | 1568970 B1 | 12/2006 |
| EP | 901000 B1 | 2/2007 |
| EP | 1463345 A3 | 10/2008 |
| EP | 1701247 A3 | 1/2009 |
| EP | 1840523 B1 | 3/2011 |
| EP | 1986170 B1 | 4/2011 |
| GB | 2329970 B | 11/2001 |
| GB | 2 366 157 A | 2/2002 |
| WO | 2007002753 A2 | 1/2007 |
| WO | 2007081929 A2 | 7/2007 |

OTHER PUBLICATIONS

European Search Report for EP Application No. 06752782.0, Mar. 1, 2010.

International Preliminary Report on Patentability mailed on Jan. 6, 2011 for PCT/CA2009/000848.

* cited by examiner

COMMUNICATION SYSTEM WITH VOICE MAIL ACCESS AND CALL BY SPELLING FUNCTIONALITY

The application claims priority to U.S. Provisional Application No. 61/074,137 which was filed on Jun. 19, 2008.

BACKGROUND OF THE INVENTION

This application relates to communication, and more particularly to a communication system with voicemail access and "call by spelling" functionality.

SUMMARY OF THE INVENTION

A method of initiating a communication from a mobile communication device includes receiving a plurality of spoken letters corresponding to a spelling of at least a portion of a contact name and identifying a contact and associated contact information from a database associated with a mobile communication device in response to the spoken letters. A communication to the contact is initiated from the mobile communication device using the associated contact information.

A method of presenting voicemail to a user establishes communication with a mobile communication device. A first voicemail box is checked for messages, the first voicemail box being associated with the mobile communication device. A second voicemail box is checked for messages, the second voicemail box being associated with a second communication device. At least one voicemail message received from at least one of the first and second voicemail boxes is presented to a user via a unified, single voice user interface.

A vehicle communication system includes a mobile communication device and a control unit in a vehicle. The control unit is in communication with the mobile communication device. The control unit is operable to receive a plurality of spoken letters corresponding to a spelling of at least a portion of a contact name and to identify a contact and associated contact information from a database associated with the mobile communication device in response to the spoken letters. The control unit is also operable to initiate a communication to the contact from the mobile communication device using the associated contact information.

A voicemail retrieval system includes a mobile communication device and a control unit in communication with the mobile communication device. The control unit is operable to check a first voicemail box associated with the mobile communication device for messages and is operable to check a second voicemail box associated with a second communication device for messages. The control unit is also operable to present at least one voicemail message received from at least one of the first and second voicemail boxes to a user via a unified, single voice user interface of a control unit.

These and other features of the present invention can be best understood from the following specification and drawings, the following of which is a brief description.

DETAILED DESCRIPTION OF THE PREFERRED EMBODIMENT

Figure 1:
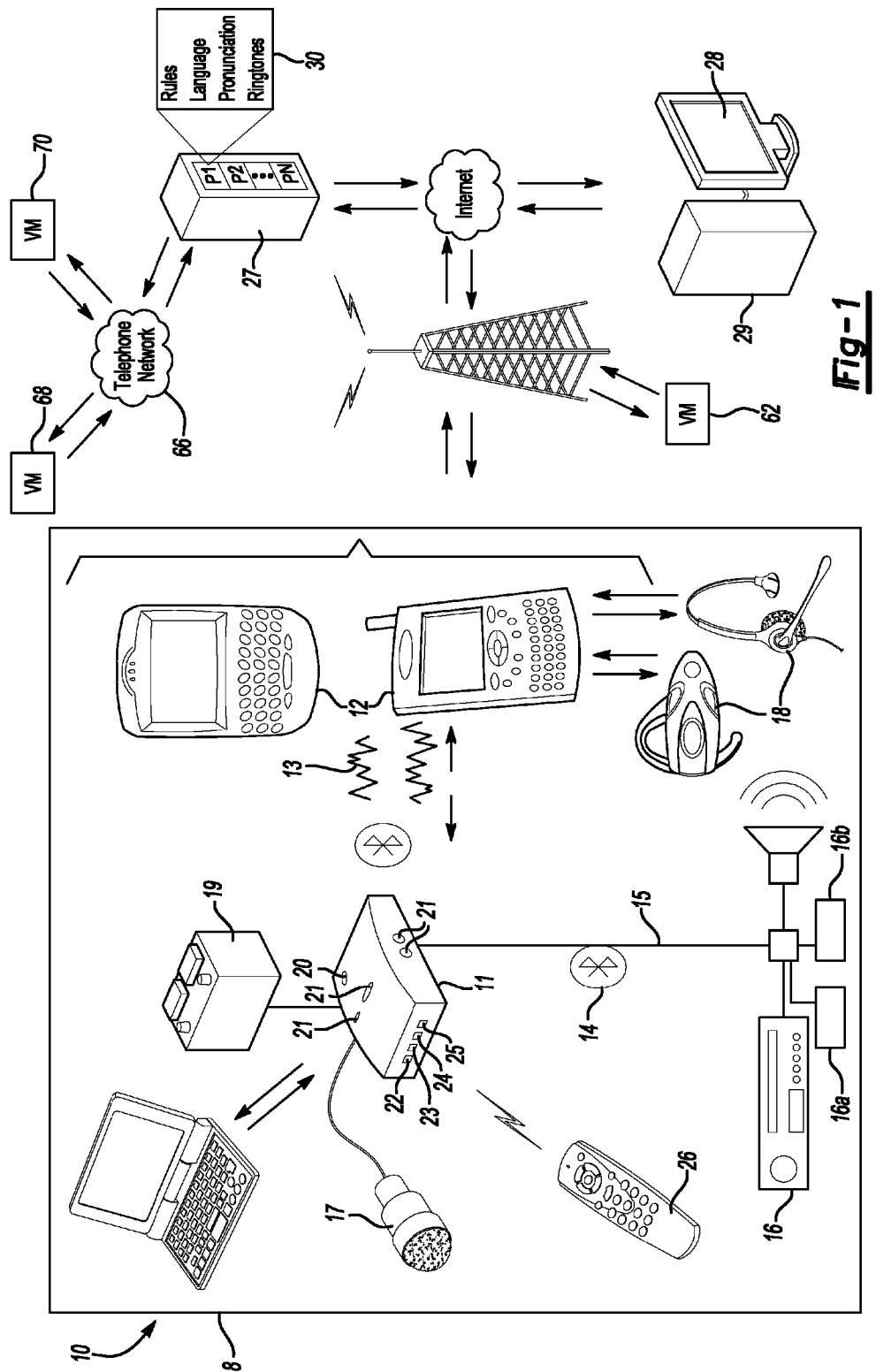
FIG. 1 schematically illustrates a communication system according to one embodiment of the present invention.

A communication system 10 is shown in FIG. 1 as implemented in a vehicle 8. The system 10 includes a device control unit 11 which, in one example, is mounted in a discreet location within the vehicle 8, such as under the dashboard, in the glove compartment, etc. The control unit 11 supports wireless communication via Bluetooth (IEEE 802.15.1) or any other wireless standard to communicate wirelessly with a cell phone, PDA, or other mobile communication device 12. In one example, all data 13 is encrypted prior to transmission. The audio output of the control unit 11 is transmitted either wirelessly 14 or through a direct, wired connection 15 to the vehicle's sound system, which may include a radio 16, satellite TV 16A, satellite radio 16B, etc. The audio input for the control unit 11 is obtained either through a directly connected microphone 17, through an existing vehicle hands-free system, or wirelessly though a headset 18 connected to the mobile communication device 12.

The control unit 11 connects to the vehicle's battery 19 for power. An AC adapter is available for use at home or in the office. For portable use in other vehicles, an optional "Y" or pass-through cable is available to plug into a cigarette lighter accessory socket for power.

The control unit 11 contains a recessed button 20 which enables the driver to do the following: register new or replacement remotes; pair the device with a new mobile communication device 12, and clear all preferences and reset the device to its factory default settings. The control unit 11 also has a set of four status lights 21 which display the following information: power and system health, vehicle connection status and activity, mobile communication device connection status and activity, and information access and general status.

In one example, the control unit 11 and the mobile communication device 12 recognize when the user, and the user's associated mobile communication device 12, are near to, or have entered the vehicle 8. This may be accomplished, for example, by Bluetooth pairing of the device 12 and the vehicle 8, or similar wireless communication initiation protocols. Within this range, the handheld device 12 changes from its normal, self-contained operating mode, to an immersive communication mode, where it is operated through the control unit 11. As will be described in more detail below, among other things, this mode enables the user to hear their emails played through the vehicle's sound system 16, or, alternatively, and if so equipped, played through the sound system of the mobile communication device 12 (e.g. headphones 18). Microphones 17 in the vehicle 8 or on the mobile communication device 12 detect user-generated voice commands. Thus, the user is not required to change modes on the mobile communication device 12; instead, the control unit 11 and associated mobile communication device 12 recognize that the user is proximate the vehicle 8 and adjust the mode accordingly.

In addition to adjusting the mode based on vehicle proximity, the system 10 may adjust between a public and a private mode. For instance, as explained above, the system's immersive communication mode ordinarily occurs when the user is proximate the vehicle 8. The immersive communication mode may have a public setting and a private setting. The public setting plays the emails over headphones 18 associated with the mobile communication device 12. Such a setting prevents a user from disturbing other occupants of the vehicle 8. The private setting plays the emails over the vehicle sound system 16, and is ordinarily used when the user is the only occupant in the vehicle 8.

Of course, such system settings may be adjusted by the user and their particular preferences in their user profile. For example, the user may prefer to switch to the immersive communication mode when the mobile communication device 12 and user are within a certain distance from the vehicle 8, whereas another user may switch modes only when the mobile communication device 12 and user have entered the vehicle 8. Further, the user may want to operate the control unit 11 and associated device 12 in a public mode, even if other occupants are in the vehicle 8.

Similarly, the system 10 recognizes when the user leaves the vehicle 8 and the mobile communication device 12 reverts to a self-contained (normal) mode. The mobile communication device 12 may also record the vehicle's location when the user leaves the vehicle 8 (based upon GPS or other information). Accordingly, the user can recall the vehicle position at a later time, either on the device or elsewhere on the system, which may aid the user in locating the vehicle 8.

The device has multiple USB ports 22. There are standard USB ports which serve the following functions: to enable the driver to store preferences, settings, and off-line memos and transcriptions on a standard USB flash drive; to permit future expansion, upgrades, and add-on features; and to connect an Ethernet dongle for high-speed internet access. In one example the control unit 11 has Internet access without the use of a dongle. In addition, the control unit 11 has a dual-purpose USB 2.0 port which in addition to the features mentioned above, provides USB 2.0 "on-the-go" functionality by directly connecting to the USB port of a notebook computer with a standard cable (i.e. similar to connecting a portable camera or GPS unit directly to a computer).

Other ports on the control unit 11 include an ⅛" audio jack 23 to connect to a car stereo without Bluetooth support, a ⅛" microphone jack 24 to support external high-quality microphones for hands-free calling, and a ⅛" stereo headset jack 25 for use away from the vehicle or in a vehicle without Bluetooth support.

The system 10 also includes an optional remote control 26 to interact with the control unit 11. The remote control contains lithium batteries, similar to that of a remote keyless entry remote for a common vehicle.

In order to provide security and privacy, the device is operable to use both authentication and encryption. Voice-based biometrics may also be used to further enhance security.

The driver stores his or her settings for the device in their settings profile 30, which may be stored in a database on an Internet server 27 (see FIG. 1), or may be stored elsewhere, such as on the mobile communication device 12 or the control unit 11. In the example where the profile 30 is stored on the server 27, the control unit 11 utilizes the Internet access provided by the driver's mobile communication device 12 to download the driver's profile 30 via the Internet. Of course, it may also be possible that the control unit 11 would use its own Internet access, and not that of the mobile communication device 12. The control unit 11 is operable to use the pairing information from the mobile communication device 12 to retrieve the correct profile 30 from the server 27. If the profile 30 has already been downloaded to the control unit 11, the control unit 11 may just check for changes and updates on the server 27. Each profile 30 on the server 27 contains a set of rules that the control unit 11 uses to make decisions on content delivery to the driver. The driver can access and modify their profile 30 on the Internet server 27 through either the Internet using a web-based interface 28 on a user computer 29, or through a simple interface directly accessible from the associated mobile communication device 12. Alternatively, the profile 30 may be always stored and modified on the control unit 11 only and can be accessed via the mobile communication device 12 and/or via a USB connection to a laptop or desktop computer.

Figure 2:
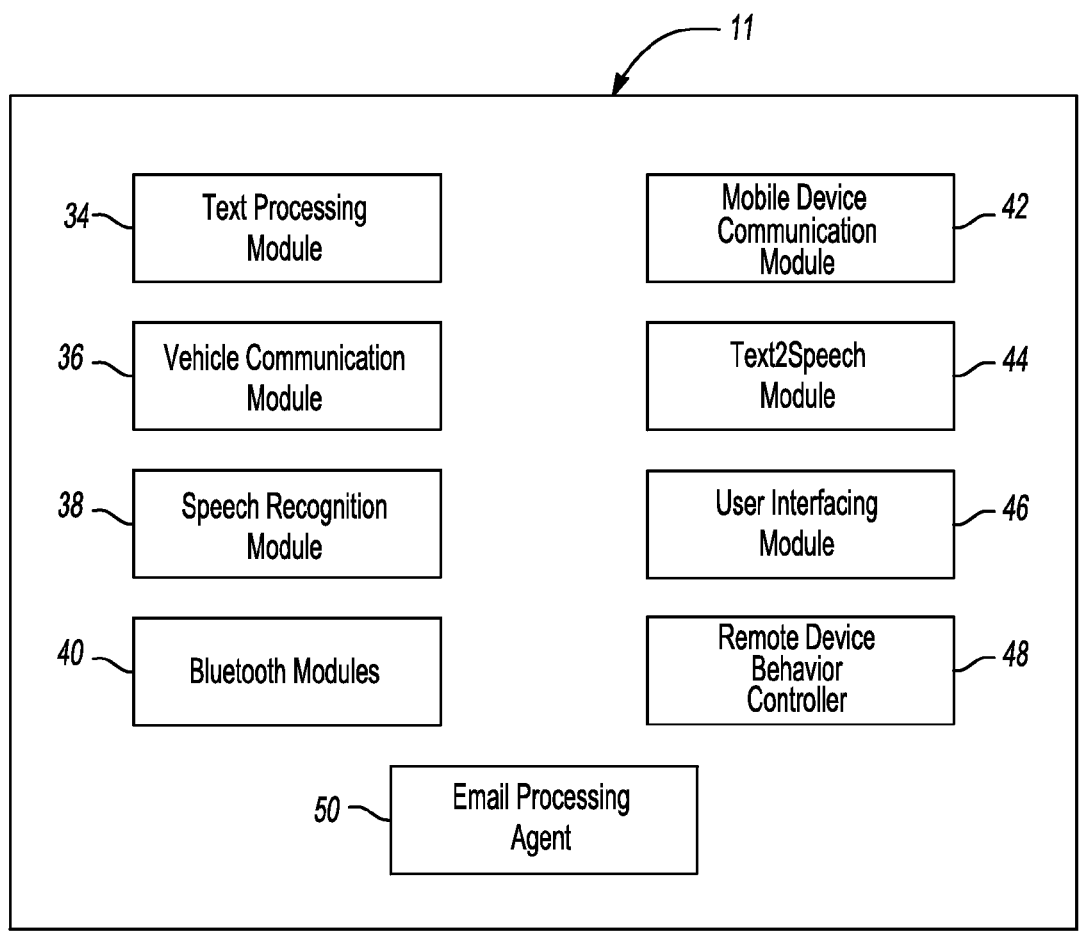
FIG. 2 illustrates some of the components of the control unit of the communication system of FIG. 1.

As shown in FIG. 2, the control unit 11 includes a text processing module 34, a vehicle communication module 36, a speech recognition module 38, Bluetooth (or other wireless communication) modules 40, a mobile communication device communication module 42, a text-to-speech module 44, a user interface module 46, and a remote device behavior controller 48. The control unit 11 has an email processing agent 50 that processes email messages and determines the identity of the sender, whether the message has an attachment, and if so what type of attachment, and then extracts the body-text of the message. The control unit 11 also determines if a message is a reminder, news, or just a regular email message. The control unit 11 is operable to use a data mining algorithm to determine if any parts of the email should be excluded (e.g. a lengthy signature).

Hands-Free Email

One feature of the system is hands-free email. Using the text-to-speech module 44, the control unit 11 can read email to the driver. When new email arrives, the control unit 11 uses the profile 30 to guide an intelligent filtering and prioritization system which enables the driver to do the following: ensure that emails are filtered and read in order of priority, limit the frequency of new email interruptions, send automatic replies without driver intervention, and forward certain emails to a third-party without interruption. In addition, prior to being read out loud, the control unit 11 processes emails to optimize clarity. Part of that process involves detecting acronyms, symbols, and other more complex structures and ensuring that they can be easily understood when read. The control unit 11 is operable to provide intelligent email summarization in order to reduce the time required to hear the important content of email when read out loud.

The driver can interact with the control unit 11 using voice commands, including "go back" and "go forward," to which the control unit 11 responds by going back to the previous phrase or sentence or the next phrase or sentence in the email respectively. In addition, speaking "go back, go back" would back up two phrases or sentences.

Additional hands-free email features include a time-saving filtering system which allows the driver to hear only the most important content or meaning of an email. Another email-related feature is the ability to download custom email parsers to add a new dimension to audible email, and to parse informal email styles (e.g., 18 r, ttyl).

The hands-free email functionality includes content-rich notification. When providing notification of a new email, the control unit 11 provides a quick summary about the incoming email, enabling the driver to prioritize which messages are more important. Examples include "You have mail from Sally" (similar to a caller-ID for email), or "You have an important meeting request from Cathy." The control unit 11 looks up the known contact names based upon the sender's email address in the user's address book on the mobile communication device 12. The control unit 11 uses known contact names to identify the parties of an email instead of just reading the cryptic email addresses out loud.

In addition to reading email, the control unit 11 also enables the driver to compose responses. The driver can send a reply using existing text or voice templates (e.g. "I'm in the car call me at 'number,'" or "I'm in the car, I will reply as soon as I can"). New emails can also be created and sent with one or more voice recording attachments (e.g., .wav file, .mp3 file). The driver is also provided the option of calling the sender of the email on the phone using existing contact information in the address book, or responding to meeting requests and calendar updates (e.g. Outlook). Emails can also be created as freeform text responses by dictating the contents of the email. The device then translates that into text form for email transmission. An intelligent assistant will be immediately available to suggest possible actions and to provide help as needed. Again all of these options are prompted by verbal inquires by the control unit 11 which can be selected by voice commands by the driver.

The control unit 11 supports multiple email accounts, and email can be composed from any existing account. Incoming email can also be intelligently handled and prioritized based upon account. Optional in-vehicle email addresses on a custom domain are available. Emails sent from this address would include a notification that the email was composed while in transit. When composing an email to an in-vehicle email address, the sender knows that the email will be read out loud in a vehicle. If the traditional email is "george@work.net," then the in-vehicle address may be "george@driving.net." Optional enhanced existing email addresses are also available on supported email systems. For example, if the traditional email is "george@work.com," an enhanced in-vehicle address of "george+driving@work.com" may be selected.

Enhanced Hands-Free Telephone Calls

Another feature of this invention is enhanced hands-free telephone calls. This includes transparent use of any existing hands-free system. All incoming telephone calls can use either the existing vehicle hands-free system or the user headset 18. If an expected important email arrives while the driver is on the phone, an "email-waiting" indicator (lights and/or subtle tones) will provide subtle notification without disrupting the conversation. The headset 18 can be activated at any time for privacy or to optimize clarity. The control unit 11 will seamlessly switch from the vehicle hands-free system to the private headset 18 for privacy.

The control unit 11 also features enhanced caller-ID. The device announces incoming calls by reading the caller name or number out loud (e.g. "This is a call from John Doe, do you want to answer it?"). This eliminates the need to look away from the road to find out who is calling. Vehicle-aware screening can also automatically forward specific calls to voicemail or to another number when driving, again based upon the driver's profile. Normal forwarding rules will resume when leaving the vehicle.

The control unit 11 also provides voice activated answering and calling. When the control unit 11 announces a telephone call, the driver can accept the call using a voice command. The driver can use voice commands associated with either contacts in an address book or with spoken phone numbers to place outgoing telephone calls (e.g. "Call Krista").

The user can say, "Call by name," to call someone in the user's contacts, or "Call by number," and then speak the phone number to the control unit 11 (for example, the control unit 11 listens to all of the numbers, without reference the user's contacts). Alternatively, the user can say, "Call by spelling" or "Call by alphabet," in which case the user then spells the name of the contact. Once the user has dictated enough letters to define a unique contact, the control unit 11 confirms the contact choice (e.g. "do you want to call John Adams?"). In one example, the control unit 11 accepts spelling exemplary word, such as "A as in alpha," "B as in boy," "C as in cat," etc. The user does not have to use a particular word for each letter, but it is easier for the control unit 11 to recognize the letter with the confirming exemplary word (just as it is for humans).

Unified Information Management

Another feature of the present invention is that it provides unified information management. The control unit 11 provides a consistent interface for seamless access to incoming and outgoing telephone calls, email, and other sources of information. The existing hands-free interface automatically switches between telephone calls, reading email, and providing important notifications. When entering the vehicle, the control unit 11 automatically provides an enhanced voice-based interface, and when leaving the vehicle, the mobile communication device 12 automatically resumes normal operation. Email reading can also be paused to accept an incoming phone call, and can be resumed when the call is complete.

In addition, the driver can communicate with any contact through email, a phone call, or an SMS text message simply by speaking. The control unit 11 provides enhanced information for incoming telephone calls. The name and number, if available, are read out loud to ensure that the driver knows the caller without looking away from the road. A nickname, or other information located in an address book, may also be used for notification.

The driver can also reply to an email with a phone call. While reading an email, the driver can contact the sender by placing a telephone call with address book information. When a phone call is made, but the line is busy or no voicemail exists, the user is given the option of sending an email to the same contact instead. This eliminates the need to wait and try calling the person again.

Within their profile 30, the driver can prioritize between email and phone calls, so that an important email will not be interrupted by a less important phone call. In addition, custom mp3 (or other format) ring tones can be associated with both incoming emails and telephone calls. Ring tones can be customized by email from certain contacts, phone calls from certain contacts, or email about certain subjects. Custom "call waiting" audible indicators can be used when an important email arrives while on the phone, or when an important phone call arrives while reading or composing an email.

Enhanced Hands-Free Calendar

Another feature of the present invention is the enhanced hands-free calendar wherein the control unit 11 utilizes the calendar functionality of the user's mobile communication device 12. The control unit 11 reads the subject and time of calendar reminders out loud, and the driver can access additional calendar information with voice commands if desired. The driver can also perform in-transit schedule management by reviewing scheduled appointments (including date, time, subject, location and notes); accepting, declining, or forwarding meeting requests from supported systems (e.g. Outlook); scheduling meetings; and automatically annotating meetings with location information. The driver can also store location-based reminders, which will provide reminders the next time the vehicle is present in a specified geographical area, and automatically receive information associated with nearby landmarks. In addition, the driver could plan and resolve meeting issues by communicating directly with other participants' location-aware devices.

Do Not Disturb

Another feature of the present invention is the "do not disturb" functionality. When passengers are present in the vehicle, the control unit 11 can be temporarily silenced. Even when silent, the control unit 11 will continue to intelligently handle incoming email, email forwarding, providing automatic email replies, and processing email as desired. A mute feature is also available.

Integrated Voice Memo Pad

Another feature of the present invention is the integrated voice memo pad, which enables the driver to record thoughts and important ideas while driving so they will not be forgotten while parking or searching for a memo pad or device. Memos can be transferred via email to the driver's inbox, or to any of the driver's contacts. Memos can also be wirelessly transferred to a computer desktop via the Bluetooth interface as the user arrives in the office, or transferred to a removable USB flash memory drive. Memos can also be annotated automatically using advanced context information including location, weather, and trip information. For example, "this memo was recorded at night in a traffic jam on the highway, halfway between the office and the manufacturing facility." Such augmented information can provide valuable cues when reviewing memos.

Access to Diverse Information

Another feature of the example embodiment of the present invention is the ability to access to diverse information. Information is available in audible form (text-to-speech) from a wide range of sources. First, the control unit 11 provides access to personal connectivity and time management information. This includes email (new and previously read), incoming caller name and number, SMS messages, MMS messages, telephone call logs, address book, calendar and schedule, and instant messages.

Second, the control unit 11 provides multi-format support. This includes email attachments that can be read out loud, including plain text, audio attachments (e.g., .wav, .mp3), HTML (e.g., encoded emails and web sites), plain text portions of Word and PowerPoint files, Adobe Portable Document format ("PDF"), OpenDocument formats, and compressed and/or encoded attachments of the above formats (e.g. .zip).

Third, the device provides environment and location awareness. This includes current location and navigation information, local weather conditions, vehicle status, and relevant location-specific information (e.g., where is "work", where is "home?").

Fourth, the control unit 11 provides remote access to information. This includes existing news sources (e.g. existing RSS feeds) and supported websites. This also includes subscription to value-added services including: weather, custom alerts (e.g. stock price triggers), traffic conditions, personalized news, e-books (not limited to audio books, but any e-book), personalized audio feeds, and personalized image or video feeds for passengers. The system obtains, translates, and provides personalized news content in audible form within a vehicle without explicit user requests. An individual may set their preferences by selecting from a set of common sources of information, or by specifying custom search criteria. When new information is available and relevant to the individual's preferences, it is read out loud to the individual when appropriate. Appropriate instances can be specified by the individual using a combination of in-vehicle presence detection, time-of-day, and importance of the information relative to other personal events including email, phone calls, meetings and text messages.

Individual preferences are fine tuned using negative feedback as specific stories and events are read out loud to the individual. This negative feedback is used in combination with the individual's personal search criteria to refine the relevance of future personalized content. In addition to online news content, the individual may also select other available online content, including stock market events and general web search terms. Some examples of personalized content include:

Weather
Custom alerts (e.g. stock price triggers)
Traffic conditions
Personalized news
e-books (Not limited to audio-books, but any e-book)
Personalized audio feeds
Personalized image or video feeds for passengers All text information is parsed and translated to optimize intelligibility before being read out loud to the individual.

Notification rules can be set by the individual using any combination of time interval, in-vehicle presence, and importance of the news event with appropriate location aware hardware support, notification rules can also include location based constraints. Desired news content can be selected using predefined templates or custom search terms.

User feedback is incorporated to maintain historical information about the news events to which the individual listens, news events that are interrupted, and news events to which the individual provides explicit feedback. This information is used to help filter subsequent news information and provide the user with more relevant news information the longer they use the service.

To minimize the volume of wireless data transfer, all searching and selection of relevant content may be performed using a server with a wired data connection. Appropriate instances to present new information are detected locally (within the vehicle). When an appropriate instance occurs, a short request is sent to trigger the transmission of the most recent personalized news information from the search server.

Personalization

Another feature in the example system 10 is extensive personalization and customization for email handling, email notification, time-sensitive rules, vehicle-aware actions, text-to-speech preferences, and multiple user support.

The email handling settings in the user's profile 30 allow the driver to use the control unit's 11 built-in intelligent email parsing and processing. This enables the driver to avoid receiving notification for every trivial incoming email. Some of the intelligent parsing features include automatic replies, forwarding and prioritization based on content and sender, and substitution of difficult phrases (e.g. email addresses and web site URLs) with simple names and words. The driver can also choose to hear only select information when a new email arrives (e.g., just the sender name, or the sender and subject, or a quick summary). Email "ring tones" are also available for incoming emails based on sender or specific keywords. Prepared text or voice replies can be used to send frequently used responses (e.g. "I'm in transit right now"). Some prepared quick-responses may be used to automatically forward an email to a pre-selected recipient such as an administrative assistant. The driver can also set up both email address configuration and multiple email address rules (e.g. use "me@work.com" when replying to emails sent to "me@work.com," but use "me@mobile.com" when composing new emails).

The driver can also customize notification. This includes prioritizing emails and phone calls based on caller or sender and subject (e.g., never read emails from Ben out loud, or if an email arrives from George, it should be read before others). The driver can also limit the amount of notifications received (e.g., set minimum time between notifications, or maximum number of emails read in a short period of time).

Time-sensitive rules in the profile 30 may include options such as "don't bother me in the morning," or "only notify me about incoming email between these hours." The driver can also configure audible reminder types based on calendar and scheduling items from the mobile communication device. Vehicle-aware actions are configurable based on the presence of the user in the vehicle. These actions include the content of automatic replies and predefined destinations and rules to automatically forward specific emails to an administrative assistant or other individual. These also include actions to take when multiple Bluetooth enabled mobile communication devices are present (e.g., switch to silent "do not disturb" mode, or take no action).

The text-to-speech settings for the control unit 11 are also configurable. This includes speech characteristics such as speed, voice, and volume. The voice may be set to male or female, and may be set to speak a number of languages, including but not limited to US English, UK English, French, Spanish, German, Italian, Dutch, and Portuguese. A base set of languages will be provided with the device, with alternate languages being available in the future. The driver can set personal preferences for pronunciation of specific words, such as difficult contact names, and specialized acronyms or symbols, such as "$H_2O$." By default, most acronyms are spelled out letter by letter (e.g., IMS, USB).

Information about specific words or phrases can be used to enhance both speech recognition performance and text-to-speech performance, which may include context sensitive shortcuts. For example, nicknames could be expanded into an email address if the driver is dictating an email. In addition, email addresses could be expanded to a common name when found. The driver can also set custom voice prompts or greetings.

The control unit 11 also features multiple user support, wherein multiple people can share the same control unit. The device automatically identifies each person by their mobile communication device 12, and maintains individual profiles 30 for each driver.

Connectivity

The connectivity functionality of the control unit 11 enables it to function as a hands-free audio system. It interacts with supported Bluetooth hands-free devices, including but not limited to Bluetooth enabled vehicles (e.g., HS, HFP, and A2DP), after-market hands-free vehicle products, and supported headsets to provide privacy. For vehicles not containing Bluetooth or other wireless support, the control unit 11 can connect directly to the vehicle's audio system 16 through a wired connection. In one example a retrofit solution could be used for existing vehicles lacking wireless connectivity in the form of an optional after-market Bluetooth kit.

The system 10 may include a remote control 26 for accessing the control unit 11. Using this feature, emergency response support may be available for direct assistance in emergencies, providing GPS location information if available. The driver could also use the control unit 11 through an advanced wireless audio/visual system, including such features as streaming music and providing image content (e.g., PowerPoint, images attached in emails, slideshows). Integrated steering-wheel column buttons could also be an available option.

The control unit 11 can also connect to a computer and external devices. This could include personal computers with Bluetooth to conveniently exchange information over a personal area network ("PAN"). This could also include GPS devices (with Bluetooth or other wireless or wired connectivity) for location awareness. This could also include storage devices (Bluetooth or other wireless or wired) for personal e-book libraries, or to manage offline content with the unified hands-free interface. In one example, an optional cable is available for controlling an iPod or other music player with voice commands. Through the device's USB ports, the driver can expand the functionality of the device by attaching such items as a USB GPRS/EDGE/3G device for direct mobile access without a separate mobile communication device, or a USB WiFi for high-speed Internet access.

Upgradeability and Expansion

The driver may add future enhancements to the control unit 11 wirelessly using standard Bluetooth enabled devices. This includes support for wireless transfer with a desktop or notebook computer to transfer and synchronize information. Advanced Bluetooth profile support (e.g. A2DP) for stereo and high quality audio is also available.

As mentioned previously, the control unit 11 will contain two USB ports. The standard USB port or ports will provide convenient access to standard USB devices for storing preferences on a standard USB flash drive; storing and moving off-line memos and transcriptions recorded by the device; and future expansion, upgrades, and add-on features. The dual-purpose USB 2.0 "On-The-Go" port or ports will provide both the aforementioned features to access USB devices, and also direct connections to a computer with a standard cable (e.g. just like connecting a digital camera or GPS unit directly to a computer).

Call By Spelling

As discussed above, a user can say, "Call by spelling" or "Call by alphabet," and the user can then proceed to spell the name of the contact. Once the user has dictated enough letters to define a unique contact, the control unit 11 confirms the contact choice through a confirmation prompt, in which a suggested contact is presented to the user (e.g., "do you want to call John Adams?"). Thus, a second portion of the spoken letters may be ignored in response to a first portion of the spoken letters being sufficient to identify a desired contact. Suggested contacts may be listed in an order of decreasing confidence, such that frequently used contacts are suggested prior to rarely used contacts.

If the user's spoken letters result in a plurality of search results, the control unit 11 presents a disambiguation prompt to the user, in which a suggested contact and a quantity of found contacts is presented (e.g., "There are 3 Johns. Did you mean John Smith?").

In one example, if multiple contacts have the same name, the control unit presents additional information about a suggested contact, such as a contact company, a contact city, a middle name, or an email address (e.g., "There are 5 John Smiths. Did you mean John at IMS?").

In response to the confirmation or disambiguation prompts, the user is given the chance to accept the suggested contact, to reject the suggested contact, to re-spell the contact, or to exit the contact spelling mode. In one example, the step of transmitting a suggested contact is repeated in response to the user rejecting the suggested contact. If the user rejects a contact a predetermined number of times (e.g. 5 times), the control unit 11 may remind the user that the user can restart the spelling process.

In one example, the control unit 11 accepts spelling exemplary word, such as "A as in alpha," "B as in boy," "C as in cat," etc. The user does not have to use a particular word for each letter, but it is easier for the control unit 11 to recognize the letter with the confirming exemplary word (just as it is for humans). Thus, the exemplary word may be used to confirm a spoken letter associated with the exemplary word.

In one example the process of comparing spoken letters to known contacts is performed using an approximate string matching algorithm. This may include the Fuzzy Bitmap algorithm using a Levenshtein distance approach for comparisons. A weighting scheme for analyzing spoken letters may place emphasis on the beginning of a spoken name, such that a larger penalty exists for missing or substituting a first letter than a missing or substituted middle or ending letter. For English language speaking, the Soundex code may be used as a starting point to define costs to substitute one letter with another.

Once the user confirms a contact, the control unit 11 initiates a communication with the contact, such as via a phone call, email, or SMS or MMS message, for example. In one example the control unit 11 receives a spoken message from a user, and then translates the speech of the spoken message into text for an email or an SMS text message.

Figure 3:
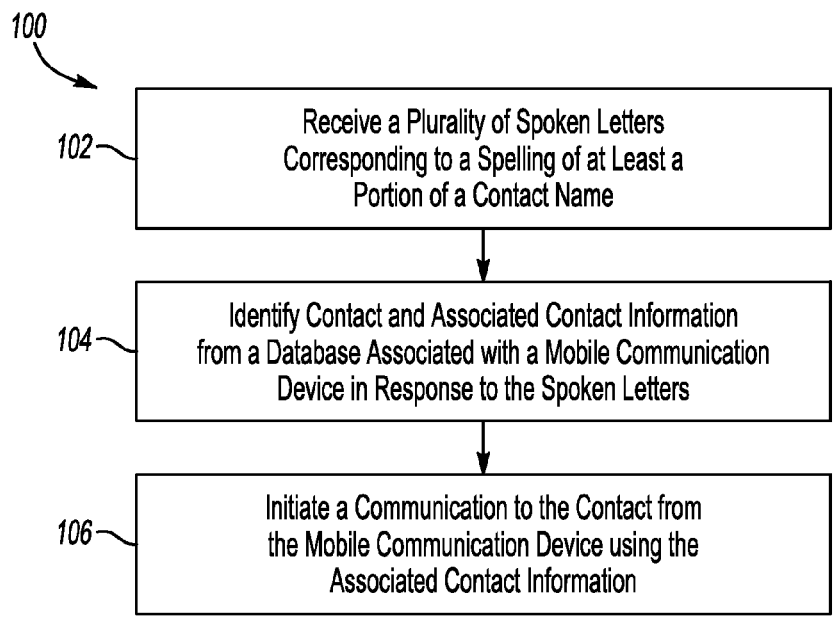
FIG. 3 schematically illustrates a method of initiating a communication from a mobile communication device.

FIG. 3 schematically illustrates a "call by spelling" method 100 of initiating a communication from a mobile communication device. A plurality of spoken letters corresponding to a spelling of at least a portion of a contact name is received (step 102). In response to the spoken letters, a contact and associated contact information is identified from a database associated with a mobile communication device (step 104). A communication to the contact is initiated from the mobile communication device using the associated contact information (step 106).

Voicemail

The control unit 11 and/or the user's profile 30 store information provided by the user for accessing voicemail accounts belonging to the user. For example, the user may have a voicemail box 62 associated with the user's mobile communication device 12, another voicemail box 68 associated with a home telephone number, another voicemail box 70 associated with a work telephone number, etc, accessible over a telephone network 66. The control unit 11 and/or server 27 provide integrated access to all of these voicemail boxes 62, 68, 70 to the user.

The control unit 11 and/or server 27 store information indicating how to access and control all of the voicemail boxes 62, 68, 70, for example: telephone number, password, control keys (e.g. "press '3' for next message"). Via a voice-driven menu on the control unit 11, the user registers each voicemail box 62, 68, 70 and the access/control information on the control unit 11, which then copies it to the server 27. The user can also choose to store this information on the server 27 (which copies it to the control unit 11) via the user's computer 29 over the wide area network. The user can also choose to store the information via the mobile communication device 12 to the server 27 and/or control unit 11. The control unit 11 can also learn remote voicemail DTMF commands in an automated or semi-automated manner, by analyzing the audio signal originating from the voicemail box 62, 68, 70 and providing appropriate audible stimuli. For example, the control unit 11 can listen for "press 3 to play the next message," and parse the spoken information to automatically associate "3" with "next".

The voicemail box 42 associated with the mobile communication device 12 will provide an indication on the mobile communication device 12 of the existence of a new voicemail message. This indication is sent to the control unit 11, which can then inform the user of the new voicemail message according to prioritization rules set up by the user. The control unit 11 and/or server 27 periodically check voicemail in the voicemail boxes 68, 70 using the stored information to provide indications of new voicemail to the control unit 11.

According to the user's stored prioritization rules, the control unit 11 notifies the user of new voicemail via speech from control unit 11. The prioritization rules could be stored on the mobile communication device 12, on the control unit 11, or on the Internet server 27, for example. The control unit 11 references voicemail meta-data and gives the user spoken or visual information about the caller, length, urgency/priority, and age of the recent voicemail messages.

The system can, without requiring direct voicemail user engagement, process existing voicemail messages and expose this content using an alternate user interface. The processing may involve previously described actions, including translation from voice to text. The system can cross-reference voicemail meta-data against local or remote databases, including the phone's addressbook, to augment voicemail caller number information with nickname or real name. By referencing a database associated with the mobile communication device 12 (e.g. the user's contacts), the control unit 11 can announce the name of the caller who left the voicemail and ask the user, "do you want to listen to a voicemail from Sarah Smith?" (for example). The control unit 11 can also facilitate responding to the voicemail, such as returning the call or responding with an email, IM or SMS message, by referencing the appropriate contact information.

The system can consolidate information across multiple voicemail systems 62, 68, 70 and present the information in a unified, single voice user interface to minimize overhead time dialing into multiple systems The system can access voicemail or PBX systems using a combination of both spoken language and/or DTMF codes, triggered by time delay, an audible event from the remote party, or a spoken command from the user. This is important to access voicemail systems in complex environments. A failsafe method exists to access voicemail in addition to any number of new services requiring DTMF access. This method augments a normal phone conversation, and presents DTMF codes to the remote party when the user speaks specific keywords. For example, many customer support systems leverage DTMF codes for access. This "failsafe" method is valuable to interact with any dial-in system without requiring pre-configuration.

In use, the control unit 11 informs the user that he/she has voice mail. The user instructs control unit 11 to access his voice mailbox with carrier, at home or at work, or other voice mailbox. The user provides control unit 11 with mailbox access code during the session or during control unit 11 installation/activation, or via voice or manual command to inform control unit 11 of the access code for each mailbox. Control unit 11 interprets the user voice command and translate to the appropriate commands of the specific mailbox, for example, if the mailbox uses the pressing of 3 on the keypad to signify moving to next message in the mailbox, the user says "next voice message," and control unit 11 translates this command to "3" and causes the mailbox to advance to the next message. The user says "delete," control unit 11 translates that to the appropriate mailbox command (commonly "7") and causes the mailbox to delete the message. The invention supports all user commands, including, read again, forward voice message, delete, save, etc. The invention supports a "translate to email" application whereby the voice mail is processed and converted to text. The translation can be forwarded to a user as text email, can be saved in the user device as text, or read to the user using control unit 11 text to speech capability. The user can chose to forward an audio copy of the voice message as an attachment to other users using the email application. The user can instruct the system to access different voice mailboxes: work voice mailbox, personal voice mailbox, family voice mailbox, or any mailbox the user labels using a certain designation.

Figure 4:
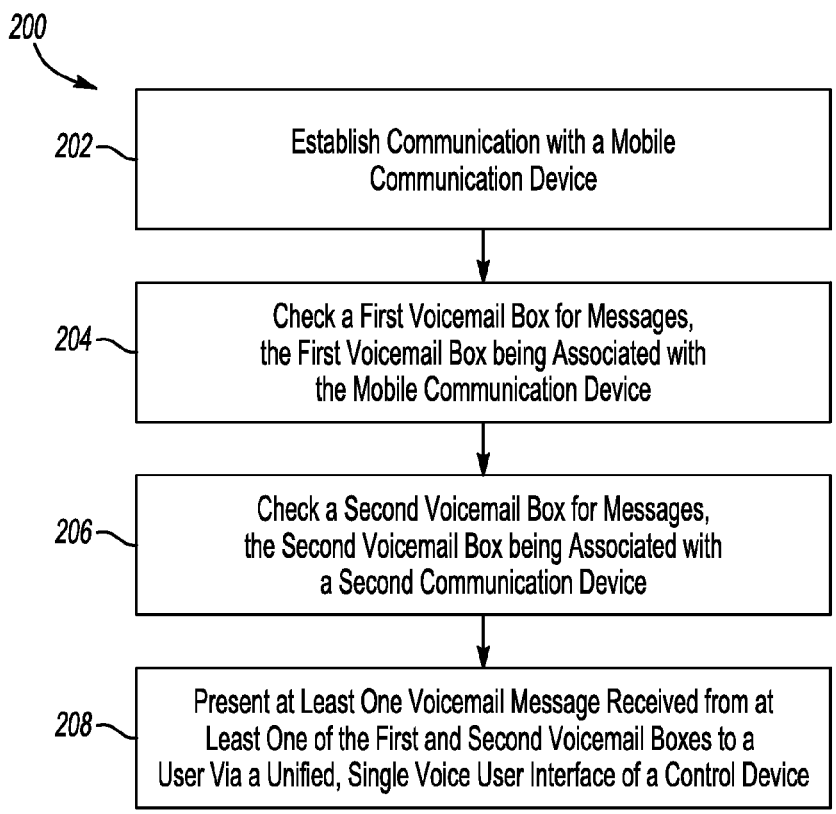
FIG. 4 schematically illustrates a method of presenting voicemail to a user.

FIG. 4 schematically illustrates a method 200 of presenting voicemail to a user. Communication is established between the control unit 11 and the mobile communication device 12

(step 202). A voicemail box 62 associated with the mobile communication device is checked for messages (step 204). A voicemail box (e.g. 68, 70) associated with a second communication device (e.g. a home phone) is checked (step 206). At least one voicemail message received from at least one of the first voicemail box 62 the second voicemail box (e.g. 68, 70) is presented to the user via a unified, single voice user interface of a control unit (step 208).

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method of initiating a communication from a mobile communication device, comprising:
    A) receiving a plurality of spoken letters corresponding to a spelling of at least a portion of a contact name;
    B) identifying a contact and associated contact information from a database associated with a mobile communication device in response to the spoken letters;
    C) initiating a communication to the contact from the mobile communication device using the associated contact information;
    D) transmitting a suggested contact in response to identification of a contact from the spoken letters; and
    E) receiving a command to accept the suggested contact, to reject the suggested contact, to re-spell contact, or to exit a contact spelling mode.

2. The method of claim 1, wherein said step (B) includes: comparing the spoken letters to known contacts in the database using an approximate string matching algorithm.

3. The method of claim 1, wherein the associated contact information is a telephone number and wherein said step (C) includes initiating a telephone call.

4. The method of claim 1, wherein said step (C) includes: receiving a spoken message for the contact; and
transmitting an email containing the spoken message to the contact.

5. The method of claim 1, wherein said step (C) includes: receiving a spoken message for the contact; and
transmitting at least one of an SMS or MMS message containing the spoken message to the contact.

6. The method of claim 1, wherein said step (B) includes: ignoring a second portion of the spoken letters in response to a first portion of the spoken letters being sufficient to identify a desired contact.

7. The method of claim 1 wherein said step (E) includes receiving the command to accept the suggested contact.

8. The method of claim 1 wherein said step (E) includes receiving the command to re-spell the contact.

9. A method of initiating a communication from a mobile communication device, comprising:
    A) receiving a plurality of spoken letters corresponding to a spelling of at least a portion of a contact name;
    B) identifying a contact and associated contact information from a database associated with a mobile communication device in response to the spoken letters; and
    C) initiating a communication to the contact from the mobile communication device using the associated contact information; wherein said step (A) includes:
    receiving at least one exemplary word for each of the plurality of spoken letters, the at least one exemplary word having the same initial letter as a spoken letter; and
    using the exemplary word to confirm a spoken letter associated with the exemplary word.

10. A method of initiating a communication from a mobile communication device, comprising:
    A) receiving a plurality of spoken letters corresponding to a spelling of at least a portion of a contact name;
    B) identifying a contact and associated contact information from a database associated with a mobile communication device in response to the spoken letters; and
    C) initiating a communication to the contact from the mobile communication device using the associated contact information;
    D) transmitting a suggested contact in response to identification of a contact from the spoken letters; and
    E) transmitting a reminder that the user can repeat step (A) in response to the user rejecting a suggested contact a predetermined quantity of times.

11. A method of initiating a communication from a mobile communication device, comprising:
    A) receiving a plurality of spoken letters corresponding to a spelling of at least a portion of a contact name;
    B) identifying a contact and associated contact information from a database associated with a mobile communication device in response to the spoken letters; and
    C) initiating a communication to the contact from the mobile communication device using the associated contact information; and
    D) transmitting a suggested contact in response to identification of a contact from the spoken letters, including indicating a quantity of identified contacts in response to identification of a plurality of contacts in said step (B).

12. A method of initiating a communication from a mobile communication device, comprising:
    A) receiving a plurality of spoken letters corresponding to a spelling of at least a portion of a contact name;
    B) identifying a contact and associated contact information from a database associated with a mobile communication device in response to the spoken letters; and
    C) initiating a communication to the contact from the mobile communication device using the associated contact information; and
    D) transmitting a suggested contact in response to identification of a contact from the spoken letters, including transmitting a name of a suggested contact and a supplemental piece of information associated with the suggested contact in response to multiple identified contacts having the same name.

13. The method of claim 12, wherein the supplemental piece of information is at least one of a contact company, a contact city, a middle name, and an email address.

14. A method of initiating a communication from a mobile communication device, comprising:
    A) receiving a plurality of spoken letters corresponding to a spelling of at least a portion of a contact name;
    B) identifying a contact and associated contact information from a database associated with a mobile communication device in response to the spoken letters; and
    C) initiating a communication to the contact from the mobile communication device using the associated contact information; and
    D) transmitting a suggested contact in response to identification of a contact from the spoken letters;
    wherein said step (D) is selectively repeated in response to the user rejecting a suggested contact.

15. The method of claim 14, wherein contacts are suggested in a decreasing order of confidence.

16. The method of claim 15, wherein frequently used contacts are suggested prior to rarely used contacts.

17. A vehicle communication system comprising:
a mobile communication device;
a control unit in a vehicle, the control unit being in communication with the mobile communication device, the control unit being operable to receive a plurality of spoken letters corresponding to a spelling of at least a portion of a contact name, to identify a contact and associated contact information from a database associated with the mobile communication device in response to the spoken letters, and to initiate a communication to the contact from the mobile communication device using the associated contact information, wherein the control unit is operable to transmit a suggested contact in response to identification of a contact from the spoken letters and wherein the control unit is operable to receive a command to accept the suggested contact, to reject the suggested contact, to re-spell contact, or to exit a contact spelling mode.

18. The system of claim 17, wherein the control unit is operable to transmit a suggested contact in response to identification of a contact from the spoken letters.

19. A method of initiating a communication from a communication device, comprising:
A) receiving a plurality of spoken letters corresponding to a spelling of at least a portion of a contact name, wherein said step A) includes: receiving at least one exemplary word for each of the plurality of spoken letters, the at least one exemplary word having the same initial letter as a spoken letter; and using the exemplary word to confirm a spoken letter associated with the exemplary word;
B) identifying a suggested contact and associated contact information from a database associated with a communication device in response to the spoken letters;
C) presenting the suggested contact in response to the identification in said step B);
D) receiving a command to accept the suggested contact after said step C); and
E) initiating a communication to the suggested contact from the communication device using the associated contact information.

20. The method of claim 19, wherein said step C) includes indicating a quantity of identified contacts in response to identification of a plurality of suggested contacts in said step (B).

21. The method of claim 19, wherein said step C) includes: presenting a name of a suggested contact and a supplemental piece of information associated with the suggested contact in response to multiple identified contacts having the same name.

22. The method of claim 21, wherein the supplemental piece of information is at least one of a contact company, a contact city, a middle name, and an email address.

23. A vehicle communication system comprising:
a mobile communication device;
a control unit in a vehicle, the control unit being in communication with the mobile communication device, the control unit being operable to receive a plurality of spoken letters corresponding to a spelling of at least a portion of a contact name, to identify a contact and associated contact information from a database associated with the mobile communication device in response to the spoken letters, and to initiate a communication to the contact from the mobile communication device using the associated contact information, wherein control unit is also operable to receive at least one exemplary word for each of the plurality of spoken letters, the at least one exemplary word having the same initial letter as a spoken letter, and wherein the control unit uses the exemplary word to confirm a spoken letter associated with the exemplary word.

24. A vehicle communication system comprising:
a mobile communication device;
a control unit in a vehicle, the control unit being in communication with the mobile communication device, the control unit being operable to receive a plurality of spoken letters corresponding to a spelling of at least a portion of a contact name, to identify a contact and associated contact information from a database associated with the mobile communication device in response to the spoken letters, and to initiate a communication to the contact from the mobile communication device using the associated contact information, wherein the control unit is operable to transmit a suggested contact in response to identification of a contact from the spoken letters, wherein the control unit is operable to present a reminder that the user can repeat the spoken letters in response to the user rejecting a suggested contact a predetermined quantity of times.

25. The system of claim 24, wherein the control unit is operable to indicate a quantity of identified contacts in response to identification of a plurality of contacts in said step (B).

26. A vehicle communication system comprising:
a mobile communication device;
a control unit in a vehicle, the control unit being in communication with the mobile communication device, the control unit being operable to receive a plurality of spoken letters corresponding to a spelling of at least a portion of a contact name, to identify a contact and associated contact information from a database associated with the mobile communication device in response to the spoken letters, and to initiate a communication to the contact from the mobile communication device using the associated contact information, wherein the control unit is operable to transmit a suggested contact in response to identification of a contact from the spoken letters, wherein the control unit is operable to present a name of a suggested contact and a supplemental piece of information associated with the suggested contact in response to multiple identified contacts having the same name.

27. The system of claim 26, wherein the supplemental piece of information is at least one of a contact company, a contact city, a middle name, and an email address.

28. A vehicle communication system comprising:
a mobile communication device;
a control unit in a vehicle, the control unit being in communication with the mobile communication device, the control unit being operable to receive a plurality of spoken letters corresponding to a spelling of at least a portion of a contact name, to identify a contact and associated contact information from a database associated with the mobile communication device in response to the spoken letters, and to initiate a communication to the contact from the mobile communication device using the associated contact information, wherein the control unit is operable to transmit a suggested contact in response to identification of a contact from the spoken letters, wherein the control unit is operable to present a second suggested contact in response to the user rejecting the suggested contact.

* * * * *